United States Patent
Macario et al.

(10) Patent No.: US 10,022,804 B2
(45) Date of Patent: Jul. 17, 2018

(54) CLAMPING DEVICE WITH COOLANT CHANNEL, METHOD OF PRODUCING THE CLAMPING DEVICE AND TOOL HOLDING PLATE FOR A LATHE WITH SUCH A CLAMPING DEVICE

(71) Applicant: Utilis AG, Müllheim (CH)

(72) Inventors: Mario Macario, Bütschwil (CH); Carmine Fabozzi, Münchwilen (CH)

(73) Assignee: Utilis AG, Mullheim (CH)

(*) Notice: Subject to any disclaimer, the term of this patent is extended or adjusted under 35 U.S.C. 154(b) by 18 days.

(21) Appl. No.: 14/437,820

(22) PCT Filed: Sep. 27, 2013

(86) PCT No.: PCT/EP2013/070186
§ 371 (c)(1),
(2) Date: Apr. 22, 2015

(87) PCT Pub. No.: WO2014/063899
PCT Pub. Date: May 1, 2014

(65) Prior Publication Data
US 2015/0298216 A1    Oct. 22, 2015

(30) Foreign Application Priority Data
Oct. 25, 2012    (CH) ..................... 2099/12

(51) Int. Cl.
*B23B 27/10*    (2006.01)
*B23B 29/04*    (2006.01)
*B23B 29/26*    (2006.01)

(52) U.S. Cl.
CPC .............. *B23B 29/04* (2013.01); *B23B 29/26* (2013.01); *B23B 2250/12* (2013.01)

(58) Field of Classification Search
CPC .............. Y10T 407/14; Y10T 407/2202; Y10T 407/2204; Y10T 407/2208; Y10T 407/221;
(Continued)

(56) References Cited

U.S. PATENT DOCUMENTS

| 2,641,047 A * | 6/1953 | Jackman | ................. B23B 27/10 |
| | | | 407/11 |
| 2,785,457 A * | 3/1957 | Pigott | .................... B23Q 11/10 |
| | | | 29/DIG. 66 |

(Continued)

FOREIGN PATENT DOCUMENTS

| CN | 200991763 Y | * | 12/2007 | ............. B23B 27/10 |
| DE | 949613 C | * | 9/1956 | ............. B23B 27/10 |

(Continued)

OTHER PUBLICATIONS

Utilis AG, "English Translation of the International Written Opinion," Int'l Patent Application No. PCT/EP2013/070186, filed Sep. 27, 2013.

*Primary Examiner* — Will Fridie, Jr.
(74) *Attorney, Agent, or Firm* — DWC Law Firm, P.A.; Ann W. Speckman; David Chen

(57) ABSTRACT

A clamping device of a tool holding plate is provided for an automatic lathe, by means of which a tool holder can be detachably fastened in a receiving slot in the tool holding plate so as to be secured in place and rotationally fixed, wherein the clamping device can be detachably fastened to the tool holding plate by fastening means. Cooling of tools during operation is provided by a coolant jet introduced into the direct vicinity of the tool by means of a coolant channel arranged in or on the clamping device, running at least partially across the clamping device from an inlet, via an intermediate channel to an outlet.

17 Claims, 3 Drawing Sheets

(58) Field of Classification Search
CPC ......... Y10T 407/2214; Y10T 407/2222; Y10T 407/2242; Y10T 407/2252; B23B 27/10; B23B 29/04; B23B 29/06; B23B 2250/12; B23C 2250/12; B23C 5/28
See application file for complete search history.

(56) References Cited

U.S. PATENT DOCUMENTS

| | | | | |
|---|---|---|---|---|
| 2,848,790 | A † | 8/1958 | McMann | |
| 3,323,195 | A * | 6/1967 | Vanderjagt | B23Q 11/10 |
| | | | | 407/11 |
| 4,695,208 | A * | 9/1987 | Yankoff | B23B 27/04 |
| | | | | 407/100 |
| 4,938,110 | A * | 7/1990 | Ruby | B23B 29/248 |
| | | | | 407/71 |
| 4,955,264 | A * | 9/1990 | Armbrust | B23B 25/02 |
| | | | | 407/11 |
| 5,272,945 | A * | 12/1993 | Lockard | B23B 29/043 |
| | | | | 407/11 |
| 6,962,468 | B2 * | 11/2005 | Shiraiwa | B23B 29/04 |
| | | | | 407/108 |
| 7,104,171 | B1 * | 9/2006 | Long | B23B 29/26 |
| | | | | 407/11 |
| 8,978,527 | B2 * | 3/2015 | Yang | B23B 27/002 |
| | | | | 407/11 |
| 9,352,396 | B2 * | 5/2016 | Hankey | B23B 29/24 |
| 9,387,538 | B2 * | 7/2016 | Smith | B23B 27/10 |
| 2008/0206004 | A1 * | 8/2008 | Giannetti | B23Q 11/10 |
| | | | | 408/56 |
| 2010/0322722 | A1 * | 12/2010 | Lin | B23B 27/007 |
| | | | | 407/11 |
| 2013/0236253 | A1 * | 9/2013 | Malka | B23B 27/086 |
| | | | | 407/11 |
| 2015/0132074 | A1 * | 5/2015 | Boissonnet | B23B 29/043 |
| | | | | 407/11 |

FOREIGN PATENT DOCUMENTS

| | | | | |
|---|---|---|---|---|
| DE | 2316591 A1 | * | 10/1973 | ............ B23B 27/10 |
| DE | 3434653 A1 | | 4/1985 | |
| DE | 10 2011 016 148 A1 | | 10/2012 | |
| DE | 202015101834 U1 | * | 4/2015 | ........... B23B 27/007 |
| EP | 0 257 005 A1 | | 2/1988 | |
| EP | 1 413 375 A2 | | 4/2004 | |
| EP | 1522382 A1 | * | 4/2005 | ......... B23Q 11/1076 |
| EP | 2 484 486 A1 | | 8/2012 | |
| EP | 2664400 A1 | * | 11/2013 | ............ B23B 27/10 |
| FR | 1279749 A | * | 12/1961 | ............ B23B 27/10 |
| JP | 04193452 A | * | 7/1992 | ............ B23Q 11/10 |
| JP | 05096444 A | * | 4/1993 | ............ B23Q 11/10 |
| JP | 07051980 A | * | 2/1995 | ............ B23Q 11/10 |
| JP | 09070736 A | * | 3/1997 | ............ B23Q 11/10 |
| JP | 10296505 A | * | 11/1998 | ............ B23B 27/10 |
| JP | 2000288801 A | * | 10/2000 | ............ B23B 27/10 |
| JP | 2003305603 A | * | 10/2003 | ............ B23B 29/00 |
| JP | 2004142049 A | * | 5/2004 | ............ B23B 29/24 |
| JP | WO 2009022570 A1 | * | 2/2009 | ............ B23B 27/10 |
| JP | WO 2015056406 A1 | * | 4/2015 | ............ B23B 27/10 |
| KR | 2012012147 A | * | 2/2012 | ............ B23Q 11/10 |
| RO | 119351 B1 | * | 8/2004 | ............ B23B 27/10 |

\* cited by examiner
† cited by third party

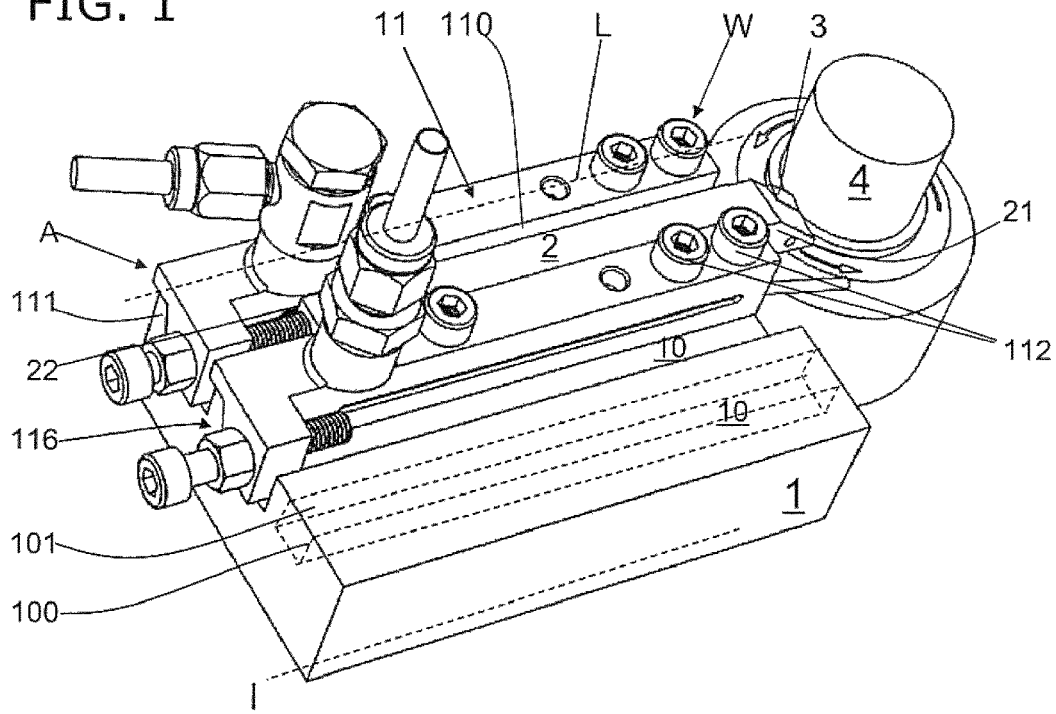
FIG. 1
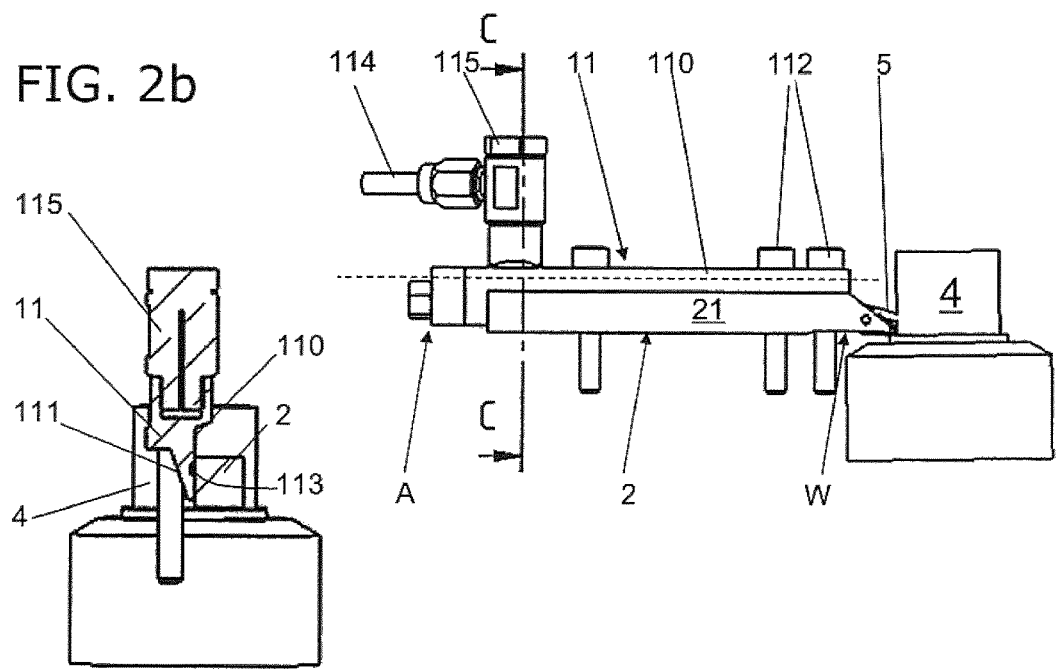
FIG. 2a
FIG. 2b
C-C prior art

CLAMPING DEVICE WITH COOLANT CHANNEL, METHOD OF PRODUCING THE CLAMPING DEVICE AND TOOL HOLDING PLATE FOR A LATHE WITH SUCH A CLAMPING DEVICE

REFERENCE TO RELATED APPLICATIONS

This application is the US national phase entry of International Patent Application no. PCT/EP2013/070186, filed Sep. 27, 2013, which claims priority to Swiss patent application no. 02099/12/12, filed Oct. 25, 2012.

TECHNICAL FIELD

The present invention describes a clamping device of a tool holder plate for an automatic turning machine, by means of which a tool holder can be releasably fastened in a positionally and rotationally fixed manner in an accommodating slot of the tool holder plate, wherein the clamping device can be fastened releasably on the tool holder plate by means of fastening means, a tool holder plate with at least one accommodating slot for releasable fastening of a tool holder by means of a clamping device, and also a production method and equipping method of a clamping device.

PRIOR ART

Known automated turning machines, particularly automated lathes are today used for manufacturing a multiplicity of products in large batch numbers for use in different technical fields. Such automatic lathes allow a fully automatic production of turned and milled products, as automatic workpiece feeding is used.

A plurality of tool holders, which are each provided with at least one tool, can be clamped in a tool holder plate, which usually has at least four accommodating slot. The tool holder plate has a plurality of accommodating slot, into which the tool holders are fastened, aligned parallel and held releasably, clamped by means of clamping devices. The tool holders are generally constructed to have a slot shape, wherein the tool, for example in the form of an indexable insert, is releasably fixed on the end facing the workpiece. If a plurality of tool holders are used in the tool holder plate, the tool to be used can be chosen quickly and simply and brought into contact with the workpiece. By executing a relative movement between tool holder plate and workpiece, the turning process is then carried out. A known tool holder plate of this type with clamped tool holder is shown schematically in FIG. 5.

To cool the turning or milling tool during the turning process, coolant is applied to the tool and this is done with the smallest possible spacing, in order to achieve an optimal cooling action.

This may take place on the one hand by means of coolant lines spaced from the tool holder plate, which coolant lines have different shapes. A coolant line of this type is aligned onto the tool at a distance from the tool holder plate, so that the coolant can be sprayed in a directed manner onto the tool in a targeted jet. In practice, it has been shown that an optimal setting of the coolant jet onto the tool is difficult. Furthermore, the coolant line projecting into the space of the tool or the workpiece to be machined is often disruptive because of its shape, if for example finished workpieces should be removed automatically by handling units integrated into machines. Even if the coolant lines are miniaturised, the same are disruptive in the case of an automated removal of workpieces, and collisions of the handling unit with the coolant line may occur.

If coolant lines of this type are arranged further away, in order to improve automatic removal, the pressure of the coolant should be increased, in order to achieve a desired cooling action. The cutting or machining process is influenced by coolant however, which impinges onto the tool at high pressure, in that the swarf flow is disturbed. The swarf can be directed back onto the component and wind around the components, which is undesired, as this swarf is to be removed again manually. Thus, a fully-automated machining is made impossible.

There has been a movement away from additional disruptive coolant lines and a tool holder has been created, in which an internal coolant channel is arranged traversing the tool holder through bores. This is shown by way of example in FIG. 6. The coolant supply line is attached to a corresponding connection on the tool holder, on the side facing away from the tool. Coolant is brought as far as the direct vicinity of the machining process through the coolant channel, traversing the tool holder, and output through a spray outlet, which is moulded on the tool holder in the region of the tool.

The swarf flow and therefore the cutting process is barely disturbed, as the coolant can be sprayed in a manner delimited locally onto the tool. As there are no disruptive structures in the region of the tool, components can also be removed automatically.

As the coolant supply line must be fastened on the tool holder, so that the coolant can flow through the tool holder as desired, each tool holder must accordingly be specially designed. Solutions have also been attempted, which continue the coolant channel out of the tool holder into a specially shaped tool. Accordingly, the tool must also satisfy the requirements and it is not possible to use any standard tool. However, it is not only the fact that the tool holders and possibly the tools must be equipped with a suitable coolant channel, application is also more difficult. If a tool has to be replaced, the tool holder must be removed from the tool holder plate. To do this, the coolant supply line must also be decoupled from the tool holder in each case and correspondingly re-attached later, which is connected with additional outlay. If the tools and/or only the tool holders are equipped with a coolant channel, then the tool holders and/or the tools are to be specially manufactured and are correspondingly expensive and complex in terms of production. It is no longer possible to use simple slot-like tool holders, as otherwise optimum cooling is not possible. In order to cool the tools, the tool holders at least must be equipped with a coolant channel. During turning operation, the coolant line must be coupled to the tool holder and as soon as a tool needs to be changed, the coolant line must be removed before the replacement of the tool holder or the tool.

In order to provide known tool holders with a round cross section with a coolant line, DE112008003674 discloses an additional component, which has an eccentric slot for a known essentially round tool holder and is provided with a channel bored into the component, through which coolant can be brought to the tool-side end of the tool holder. The additional component is specially adapted to the essentially round tool holder to be accommodated and fastening means are provided, in order to hold the tool holder in the eccentric slot.

By using the additional component according to DE112008003674, an existing slot-shaped tool holder could be used and fastened in the assembled eccentric slot. If a tool or the tool holder must be replaced, a coolant supply line, which communicates with the channel, can remain at the component during the replacement of the tool holder.

For retrofitting existing automatic turning machines, additional components must be manufactured as described above, into which existing tool holders can be inserted, wherein the tool holder should be screwed directly into the additional components. An extra component of this type is expensive in terms of production. Steel is generally used, wherein exact bores must be created, which traverse the extra component, so that a suitable coolant channel can be constructed running in the extra component.

As existing lathe machines have tool holder plates with at least one slot for accommodating standardised tool holders, the existing tool holder plate on the turning machines must be changed accordingly for accommodating the additional component.

DESCRIPTION OF THE INVENTION

The present invention has set itself the object of creating a possibility of creating an optimised cooling of tools during operation, wherein a coolant jet is brought into the direct vicinity of the tool, a simplified replacement of the tool or the tool holder is enabled without decoupling the coolant line, and also a simple equipping of known tool holder plates of existing turning machines is enabled without changes at the automatic turning machines.

This is achieved with an improved clamping device for the tool holder in at least one slot of the tool holder plate. In addition to the fixing, the clamping device is therefore used for conveying the coolant by means of a coolant channel, whereby the clamping device has two functions.

The equipping of an existing clamping device inter alia by shaping a groove as coolant channel is also provided by the present invention.

BRIEF DESCRIPTION OF THE DRAWINGS

A preferred exemplary embodiment of the subject of the invention is described in the following in connection with the attached drawings.

FIG. 1 shows a perspective view of a tool holder plate with two clamping devices and a releasably held tool holder.

FIG. 2a shows a side view of a tool holder and a clamping device, wherein the tool holder plate has been omitted for the sake of clarity, whilst FIG. 2b shows a sectional view along the line C-C from FIG. 2a.

DESCRIPTION

Figure 3:
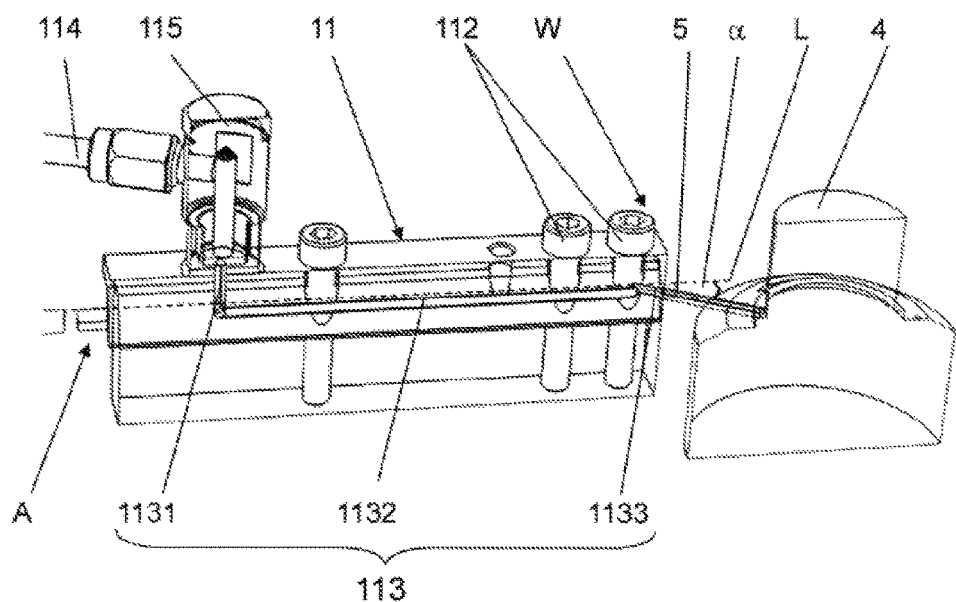
FIG. 3 shows a longitudinal section through a clamping device with eccentrically running coolant channel, whilst

A tool holder plate 1 for a turning machine, more precisely for automatic turning machines and therefore for a turning machine, in which a machining manufacturing process of a workpiece 4 can proceed fully automatically, is illustrated in FIG. 1. In this case, the turning machine and automation devices, for example handling units integrated in the turning machine for the automatic equipping of a tool holder with tools, have not been illustrated for the sake of clarity.

The tool holder plate 1 has a plurality of accommodating slots 10. Here, one is concerned with a tool holder plate 1 that is used as standard and commercially available and is used widely in commercially available lathe machines, wherein two recessed accommodating slots 10 are illustrated. The tool holder plate 1 is optimised on the basis of the shaping of the accommodating slots 10 for accommodating tool holders 2 using a slot and is commercially available. The tool holder 2 carries a tool 3 on the tool-side in a tool slot, for example an indexable insert 3, as illustrated in the figures here. A relative movement between the tool holder plate 1 and therefore between at least one inserted tool 3 and a workpiece 4 can be carried out, as a result of which the machining can be carried out.

Each accommodating slot 10 is formed by a bearing surface, a tool bearing surface 100 and an opposite clamping wedge surface 101, wherein these surfaces run in the direction of the longitudinal direction 1 of the tool holder plate 1.

After inserting the tool holder 2 into the accommodating slot 10, the same is aligned in the longitudinal direction 1 in such a manner that the tool 3 protrudes from the accommodating slot 10 and can be brought into contact with the workpiece 4 as desired. Once the alignment of the tool holder 2 has taken place, the same is releasably fixed in the accommodating slot 10 in a clamping manner by means of a clamping device 11. The clamping device 11 has a tool-side end W and a stop-side end A along its longitudinal axis L. A positionally and rotationally fixed fixing of the tool holder 2 is achieved by means of the clamping device.

To fix the tool holder 2, the clamping device 11, which usually has a wedge-like shape in a plane perpendicular to the longitudinal axis L of the clamping device 11, can be inserted between a first side surface 20 of the tool holder 2 and the clamping wedge bearing surface 101 of the accommodating slot 10. The clamping device 11 presses the tool holder 2 against a tool bearing surface 100 of the accommodating slot 10 using a second side surface 21. A clamping surface 110 in this case bears directly against the first side surface 20 of the tool holder 2 in a parallel running manner, whilst a wedge surface 111 points in the direction of the clamping wedge bearing surface 101 of the accommodating slot 10 on the side of the wedge surface 111 opposite the clamping surface 110.

Figure 6:
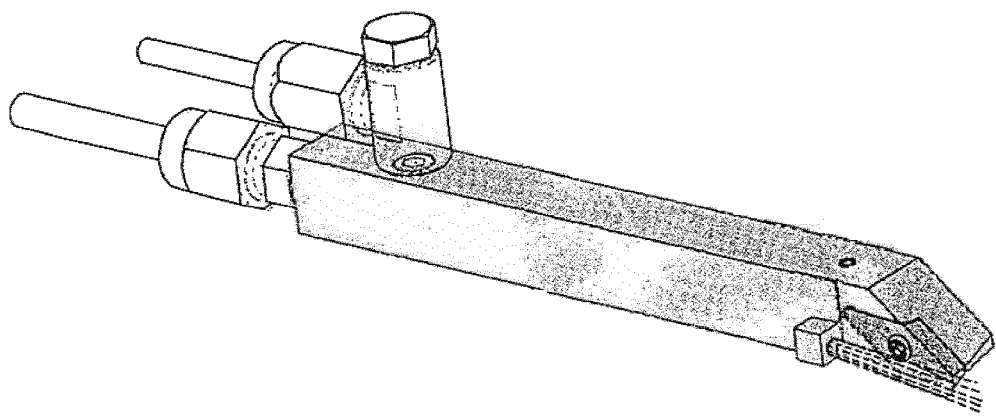
FIG. 6 shows a perspective view of a tool holder with integrated coolant channel and outlet nozzle in the region of the tool.

The clamping device 11 and therefore the tool holder 2 can be releasably fastened on the tool holder plate 1 by means of fastening means 112, so that the tool holder 2 can also be releasably fastened in the accommodating slot 10. A plurality of screws are provided here as fastening means 112, which are provided with a hexagonal socket and can simply be screwed tight on the tool holder plate 1, whereby the tool holder 2 can be held indirectly in a clamping and positionally fixed and rotationally secured manner. Such a tool holder plate 1 with clamping device 11 for fastening tool holders 2 is known as such from the prior art, which can also be seen from FIG. 6.

The clamping device 11 illustrated here according to FIG. 1 is designed to be longer in the direction of the longitudinal axis L thereof than the tool holder 2 and novelly has a stop 116 on the stop-side end A facing away from the tool 20. The tool holder 2 can be fastened or aligned relatively to the clamping device 11 up to the contact of an end surface 22 of the tool holder 2 with the stop 116. For simple adjustment of the tool holder 2, a stop 116 is provided with a screw, which can be screwed by means of a projection on the stop-side end A to the desired deflection parallel to the longitudinal axis L of the clamping device 11.

In order to cool the tool 20 during the turning process, a coolant is applied onto the tool 20 through a coolant channel 113 running through the clamping device 11 at least to some extent. This can be seen in the FIGS. 2b, 3 and 4. The coolant is introduced into the coolant channel 113 by a coolant supply line 114 and a connected coupling 115, before it is deflected, after passing through the coolant channel 113, in a targeted fashion under a sufficiently high pressure onto the tool 3 by means of a coolant jet 5. In the sectional view of FIG. 2b along the line C-C from FIG. 2a, it can be seen that the coolant channel 113 here runs in a partially sloted manner in the clamping surface 110. The coolant channel 113 is therefore realised open to the first side surface 20 of the tool holder 2.

The path of the coolant via the coolant supply line 114, the coupling 115 into the coolant channel 113 is illustrated in the sectional view according to FIG. 3. The coolant channel 113 comprises an inlet 1131, an intermediate channel 1132 and an outlet 1133.

The external coolant channel 114 can be realised as a pipe or hose made from metal, particularly from high-grade steel or from plastic, particularly from PTFE, PFA, vinyl, nylon, polyethylene or rubber, usually with a nominal size of ⅛ inch. The coolant supply line 114 is fastened on a coupling 115, which can have different shapes and can be constructed inter alia as a quick coupling.

The aperture of the coupling 115 opens into the inlet 1131, which is here arranged approximately perpendicular to the direction of the longitudinal axis L of the clamping device 11. The inlet 1131 is realised as a bore and traverses the clamping device 11 approximately perpendicularly to the longitudinal axis L up to half of the transverse extent of the clamping device 11. It is advantageous if the opening from the coupling 115 into the inlet 1131 is arranged as far as possible from the machining region or from the tool 3.

The inlet 1131 can optionally also be arranged in the region of the stop-side end A of the clamping device 11, wherein a correspondingly longer intermediate channel 1132 must then be constructed. In this case, the coolant supply line 114 is only guided up to the stop-side end A of the clamping device 11 and the coupling 115 is likewise shifted to the stop-side end A.

The intermediate channel 1132 adjoins the inlet 1131, which intermediate channel traverses the body of the clamping device 11 at least to some extent and opens into the outlet 1133. The outlet 1133 is arranged in the region of the tool-side end W of the clamping device 11 in such a manner that, in the case of a securely clamped clamping device 11, a coolant jet 5 is directed onto the tool-side end of the tool holder 2 or onto the tool 3 fastened thereon. Here, the outlet 1133 is shaped as a bore through the body of the clamping device 11. This bore is sloted running at a deflection angle α relatively to the longitudinal axis L of the clamping device 11.

In a preferred embodiment, the intermediate channel 1132 is configured as a groove 1132 in the clamping surface 110 of the clamping device 11. As the clamping device 11 also consists of steel, bores traversing the body of the clamping device 11 completely are time-consuming and expensive to produce, for which reason, the sloting of the groove 1132 in the clamping surface 110 is advantageous. If the groove 1132 is chosen as intermediate channel 1132, three side surfaces of the intermediate channel 1132 are formed by the body of the clamping device 11, whereby an open intermediate channel 1132 results from this. The coolant channel 113 is therefore realised to be partially open towards the clamping surface 110.

In tool holders 2 securely clamped by means of a clamping device 11, the first side surface 20 of the tool holder 2 and the clamping surface 110 of the clamping device 11 lie flush parallel with one another, so that the first side surface 20 seals the intermediate channel 1132 of the coolant channel 113 with respect to the tool holder 2. As a result, coolant is conveyed through the groove 1132 formed in the clamping surface 110 up to the outlet 1133 also at high pressure. If the intermediate channel 1132 is shaped as a groove in the clamping surface 110, the side surface 20 of the tool holder 2 is used as end surface of the intermediate channel 1132 and is partially pre-cooled, whilst the coolant flows through the intermediate channel 1132 in the direction of the tool-side end W.

The intermediate channel 1132 can also be arranged as a closed channel into the body of the clamping device 11, connecting the inlet 1131 and the outlet 1133 within the clamping device 11. In this case, the coolant channel 113 can be introduced running centrally or eccentrically through the body of the clamping device 11. The coolant channel 113 is then arranged completely remotely from the first side surface 20 and the tool holder 2. Therefore, the coolant channel 113 is arranged running in the clamping device 11 and spaced from the tool holder 2.

In a further embodiment, the outlet 1133 can be formed as a groove in the clamping surface 110, wherein the end of the outlet 1133 is configured on the tool-side end W of the clamping device 11 as a groove with the deflection angle with respect to the longitudinal axis L in a longitudinal section plane. A modification of this type is not illustrated in the figures. The production of the outlet 1133 is correspondingly facilitated.

Figure 4:
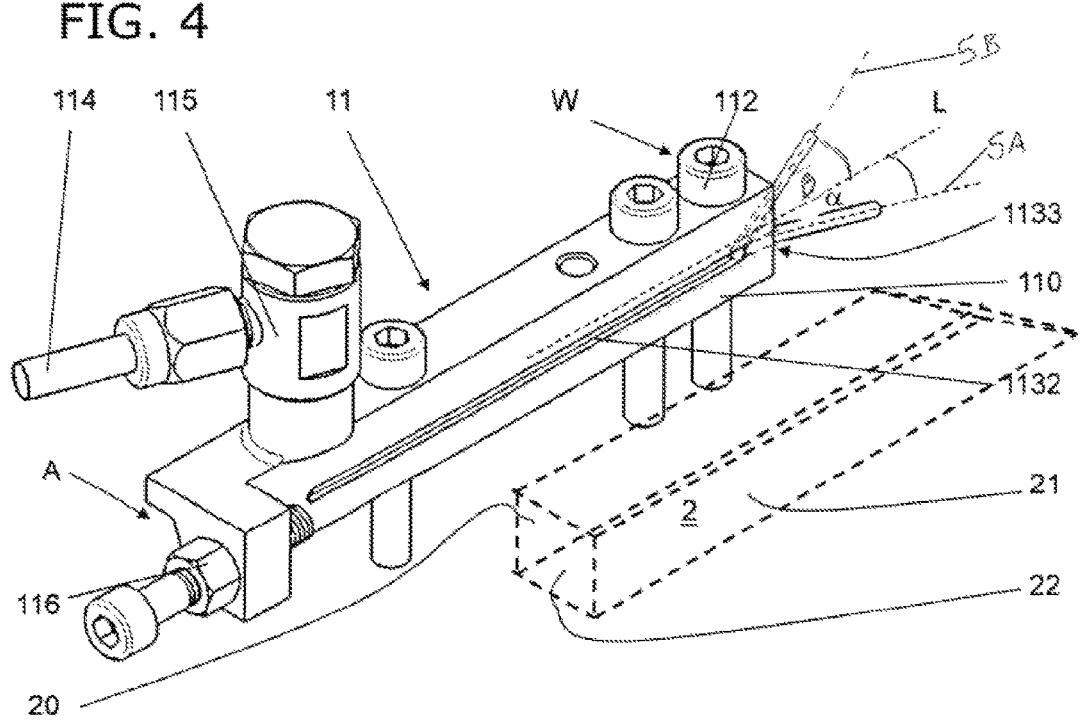
FIG. 4 shows a perspective view of a clamping device with an intermediate channel realised as a groove and a tool holder that is indicated dashed.
Figure 5:
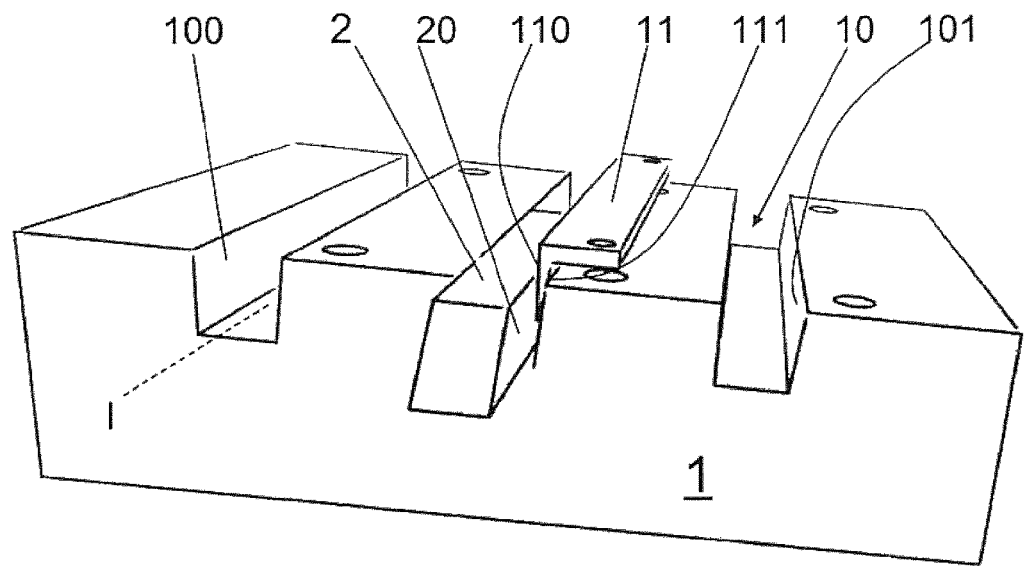
FIG. 5 shows a perspective schematic view of a tool holder plate with clamping device for the releasable connection of slot-shaped tool holders according to the prior art.

The outlet 1133 can also be constructed from a plurality of outlet channels or bores, as shown in FIG. 4, depending on the requirement for the coolant jets 5A, 5B (for example) to be achieved or the machining application to be carried out. Accordingly, the outlet channels, which form the outlet 1133, can be aligned at different deflection angles α, β relative to longitudinal axis L.

Production Method and Equipping Method of a Clamping Device

Existing tool holder plates 1 with at least one accommodating slot 10, in which a tool holder 2 can be held releasably by means of a clamping device 11, can be equipped easily and can be equipped with the new cooling system. The clamping device 11 exclusively must be adapted, the tool holder plate 1 and the tool holder 2 remaining unchanged. The clamping device 11 must be provided with the coolant channel 113, wherein the inlet 1131, the intermediate channel 1132 and the outlet 1133 are attached in or on the body of the clamping device 11 in various configurations, as described above. The inlet 1131 is connected to the coupling 115 and the coolant supply line 114 can then be releasably connected to the coupling 115.

Thus, during a tool replacement, the coolant supply line 114 can remain fastened on the clamping device 11 and accordingly, the cooling can be restarted quickly after the tool replacement. The refitting by exchanging existing clamping devices with clamping devices 11 with integrated coolant channel 113 can be carried out easily and quickly. Furthermore, standardised tool holder plates 1 and tool holders 2 can be used.

In the embodiments described here, the coolant channel 113 can be fastened indirectly or directly on the tool holder 2, depending on the configuration of the sections of the coolant channel 113. As the coolant channel does not pass through the tool holder 2, known simple and one-piece tool holders 2 can furthermore be used. If the coolant supply line 114 is coupled by means of coupling 115 on the clamping device 11, even a removal of the tool holder 2 can take place without the coolant supply line 114 having to be dismantled.

REFERENCE LIST

1 Tool holder plate
l Longitudinal direction
10 Accommodating slot
100 Tool bearing surface
101 Clamping wedge bearing surface
11 Clamping device
110 Clamping surface
111 Wedge surface
112 Fastening means
113 Coolant channel
1131 Inlet
1132 Intermediate channel
1133 Outlet
114 Coolant supply line
115 Coupling
116 Stop
α Deflecting angle
L Longitudinal axis
W Tool-side end
A Stop-side end
2 Tool holder (turning tool)
20 First side surface
21 Second side surface
22 End surface
3 Tool (turning tool, e.g. indexable insert)
4 Workpiece
5 Coolant jet

The invention claimed is:

1. A clamping device of a tool holder plate for an automatic turning machine, by means of which a tool holder can be releasably fastened in a positionally and rotationally fixed manner in an accommodating tool holder slot of the tool holder plate, wherein the clamping device can be fastened releasably on the tool holder plate by means of a fastening element, and wherein
the clamping device has an angled, wedge-like longitudinal surface aligned in the longitudinal direction of the clamping device and configured to contact a mating wedge-like surface of the tool holder slot in the tool holder plate, and
a coolant channel traversing less than a full length of the clamping device is arranged in or on the clamping device running from an inlet, via an intermediate channel, to an outlet.

2. The clamping device according to claim 1, wherein the coolant channel is arranged running centrally or eccentrically through the body of the clamping device, running at least somewhat parallel to the longitudinal axis of the clamping device.

3. The clamping device according to claim 1, wherein the coolant channel has an intermediate channel, which is formed by a groove in a longitudinal surface of the clamping device that contacts a mating longitudinal surface of the tool holder slot, wherein the coolant channel is partially open towards the surface of the tool holder slot.

4. The clamping device according to claim 1, wherein the outlet is deflected in a longitudinal section plane by a deflection angle (a) relatively to the longitudinal axis of the clamping device.

5. The clamping device according to claim 4, wherein the outlet comprises a plurality of outlet channels or bores aligned at different deflection angles to the longitudinal direction of the clamping device.

6. The clamping device according to claim 4, wherein the outlet is formed as a groove in a longitudinal surface of the clamping device.

7. The clamping device according to claim 1, wherein the inlet is arranged as remotely as possible from the machining region or from a tool mounted in the tool holder, and wherein the inlet is provided closer to a stop side end opposite a tool-side of the clamping device.

8. The clamping device according to claim 1, comprising a coupling at the inlet, to which a coolant supply line can be coupled.

9. The clamping device according to claim 8, wherein the coupling is a quick coupling.

10. A clamping device of a tool holder plate for an automatic turning machine, by means of which a tool holder can be releasably fastened in a positionally and rotationally fixed manner in an accommodating tool holder slot of the tool holder plate, wherein the clamping device can be fastened releasably on the tool holder plate by means of a fastening element, wherein
the clamping device has an angled, wedge-like longitudinal surface aligned in the longitudinal direction of the clamping device and configured to contact a mating wedge-like surface of the tool holder slot in the tool holder plate,
a coolant channel is arranged in or on the clamping device running from an inlet, via an intermediate channel, to an outlet, and
a stop is arranged in a region of a stop-side end, against which an end surface of the tool holder can bear in a defined manner during installation of the tool holder and the stop comprises a screw, by means of which the deflection of the tool holder can be defined.

11. The clamping device of claim 1, additionally comprising a tool holder plate with at least one accommodating slot for the releasable fastening of a tool holder, wherein the accommodating slot has a clamping wedge surface bearing against the angled, wedge-like longitudinal surface of the clamping device.

12. A production method and equipping method for a clamping device according to claim 1, for the releasable fastening of a tool holder in an accommodating slot of a tool holder plate for an automatic turning machine, wherein the clamping device has an angled, wedge-like, longitudinal clamping surface, which can be brought directly or indirectly into contact with a first mating angled, wedge-like side surface of the tool holder in a clamping manner,
comprising the steps of:
mounting the clamping device in the tool holder by bringing the mating, angled, wedge-like surfaces of the clamping device and the tool holder in contact with one another along the longitudinal axis of the clamping device,
providing a coolant channel, comprising an inlet, an outlet and an intermediate channel in the body of the clamping device, wherein the coolant channel traverses less than a full length of the clamping device, and providing coolant to the coolant channel inlet through a coupling arranged on an upper exposed surface of the clamping device.

13. The production method and equipping method for a clamping device according to claim 12, wherein the coolant channel has an intermediate channel formed by a groove in a longitudinal surface of the clamping device.

14. The clamping device according to claim 1, wherein the inlet is arranged at an angle to the longitudinal axis of the clamping device.

15. The clamping device according to claim 14, wherein the inlet is arranged approximately perpendicularly to the longitudinal axis of the clamping device.

16. The clamping device according to claim 8, wherein an opening from the coupling into the inlet is arranged on an upper exposed surface of the clamping device.

17. The clamping device according to claim 1, additionally comprising a plurality of fastener bores in the clamping device for releasably fastening the tool holder in place on the tool holder plate.

\* \* \* \* \*